United States Patent
Gurski et al.

(10) Patent No.: US 7,085,295 B2
(45) Date of Patent: Aug. 1, 2006

(54) METHOD AND APPARATUS FOR SEARCHING FOR PILOTS OVER CODE SPACE IN A CDMA COMMUNICATION SYSTEM

(75) Inventors: Remi Gurski, San Diego, CA (US); Serguei A. Glazko, San Diego, CA (US); Raghu Challa, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 598 days.

(21) Appl. No.: 10/002,063

(22) Filed: Oct. 25, 2001

(65) Prior Publication Data

US 2003/0086396 A1 May 8, 2003

Related U.S. Application Data

(60) Provisional application No. 60/327,498, filed on Oct. 4, 2001.

(51) Int. Cl.
*H04J 3/06* (2006.01) M

(52) U.S. Cl. ...................... 370/520; 370/514 M

(58) Field of Classification Search ............ 370/320, 370/335, 342, 441, 503, 514, 516, 520; 375/145, 375/152
See application file for complete search history.

(56) References Cited

U.S. PATENT DOCUMENTS

| | | | | |
|---|---|---|---|---|
| 5,642,377 A | * | 6/1997 | Chung et al. | 375/145 |
| 5,805,648 A | * | 9/1998 | Sutton | 375/367 |
| 6,549,545 B1 | * | 4/2003 | Yamamoto et al. | 370/508 |
| 6,771,622 B1 | * | 8/2004 | Banerjee | 370/331 |

FOREIGN PATENT DOCUMENTS

| | | |
|---|---|---|
| EP | 0942539 | 9/1999 |
| WO | 942539 A2 * | 9/1999 |
| WO | 0176087 | 10/2001 |

* cited by examiner

*Primary Examiner*—Duc Ho
*Assistant Examiner*—Thien D. Tran
(74) *Attorney, Agent, or Firm*—Philip R. Wadsworth; Charles D. Brown; George C. Pappas

(57) ABSTRACT

Techniques to search for pilots over code space in a CDMA system. In one aspect, the pilot search is performed using a number of substages, and the search windows for each substage are selected such that the relevant code space is searched while reducing search time. In one specific implementation, two substages are used to search for pilots. The detect substage searches through (e.g., fixed-size) search windows to detect for peaks in the received signal. The dwell substage then searches through (e.g., variable-size) search windows to re-evaluate the detected peaks and remove noise peaks. The dwell windows may be formed such that a code space as small as possible is searched (to reduce search time) but large enough to account for possible drift in the detected peaks. Variable number of peaks may be provided by the dwell substage for the variable-size dwell windows.

29 Claims, 7 Drawing Sheets

METHOD AND APPARATUS FOR SEARCHING FOR PILOTS OVER CODE SPACE IN A CDMA COMMUNICATION SYSTEM

BACKGROUND

This application claims the benefit of provisional U.S. Application Ser. No. 60/327,498, entitled "METHOD AND APPARATUS FOR SEARCHING FOR PILOTS OVER CODE SPACE IN A CDMA COMMUNICATION SYSTEM," filed Oct. 4, 2001, which is incorporated herein by reference in its entirety for all purposes.

FIELD

The present invention relates to data communication, and more particularly to techniques for searching for signals (e.g., pilots) over code space in a CDMA communication system.

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques. CDMA systems may provide certain advantages over other types of system such as increased system capacity. A CDMA system is typically designed to conform to one or more standards, such as IS-95, cdma2000, IS-856, and W-CDMA standards, all of which are known in the art and incorporated herein by reference.

A terminal in a CDMA system needs to acquire signals transmitted from one or more base stations in order to receive or exchange data. In many CDMA systems, a pilot is transmitted from each base station to assist the terminals perform a number of functions. The pilot is typically generated based on a known data pattern (e.g., a sequence of all zeros) and using a known signal processing scheme (e.g., covered with a Walsh code of zero and spread with a known pseudo-random noise (PN) sequence). For IS-95 and cdma2000 systems, each base station is assigned a specific PN offset that is different from those of neighboring base stations to allow the terminals to distinguish the individual base stations. The pilots from the base stations may be used at the terminals for acquisition, frequency and timing synchronization, channel estimation, coherent demodulation of data transmission, and so on.

The search for pilots in a CDMA system is made challenging due to various phenomena. First, the pilots are distorted by noise and interference in the communication link, which can make detection of the pilots difficult at a terminal. In many instances, it may be difficult to differentiate transmission environment, a transmitted pilot may reach the terminal via a number of signal paths, and the received signal at the terminal typically includes multiple instances of the pilot at various amplitudes, phases, and delays. And third, since the terminal may not be aware of its location and/or timing relative to system time, a large PN code space may need to be searched to find the pilots.

To provide improved search results and to reduce search time, the search for pilots may be performed in two substages. The first (detect) substage performs an initial sweep over the entire PN code space to be searched and provides a number of detected peaks. These detected peaks typically include noise peaks, some of which may be comparable in magnitude or may even be larger than the pilot peaks. The second (dwell) substage then re-evaluates each detected peak to verify whether the peak is a pilot or noise peak. To reduce the search time, the dwell for each detected peak is typically performed over a small search window centered at the peak, with the size of the window ($W_{dw}$) selected to be just large enough to account for possible drift in the peak between the detect and dwell substages.

In many instances, the detected peaks may be closely spaced in time (and thus in PN code space). If two or more detected peaks are within $W_{dw}$ PN chips of each other, then their search windows for the dwell substage can overlap. In this case, the dwell substage may provide the same search result for multiple overlapping windows.

Duplicate dwell results are undesirable for several reasons. First, a peak omitted because of a duplicate search result may nevertheless be among the largest peaks that should be processed. Second, valuable resources (e.g., finger processors) may be tied up processing the same peak, which would then prevent the processing of other valid peaks. Both of these effects may degrade performance.

There is therefore a need in the art for techniques to effectively search for signals (e.g., pilots) over code space in a CDMA system.

SUMMARY

Aspects of the invention provide techniques to search for pilots over a designated code space. These techniques may provide improved probability of detection and/or shorter search time. In one aspect, the pilot search is performed using a number of substages, and the search windows for each substage may be selected such that the relevant code space is searched while at the same time reducing the search time.

In one specific implementation, two substages are used to search for pilots. A first (detect) substage searches through (e.g., fixed-size) search windows to detect for peaks in a received signal. The detect substage may be used to provide a particular number of ($M_{det}$=60) detected peaks for the entire code space searched, and may further be designed to provide a fixed number of detected peaks for each search window. A second (dwell) substage then searches through (e.g., variable-size) search windows to re-evaluate the detected peaks. Variable number of peaks may be returned by the dwell substage for variable-size search windows.

In general, the pilot search may be performed using any number of substages, and each substage searches for pilots over a respective set of search windows. The earlier substage(s) may be used to initially sweep through the entire code space to be searched, and the subsequent substage(s) may be used to re-evaluate the detected peaks. The search windows for each subsequent substage may be formed such that a code space as small as possible is searched (to shorten search time) but large enough to cover potential drifts in the peaks. This may be achieved by generating variable-size search windows and returning variable number of search results for each such search window. The search windows may also be formed in a manner to take into account various factors such as the limitations of the hardware. For example, the search windows may be formed such that no more than a particular number of (e.g., 8) peaks are to be reported for each search window.

The pilot search techniques described herein may be used for the forward link, and possibly the reverse link, in various CDMA systems such as IS-95, cdma2000, and W-CDMA. The invention further provides other methods, demodulators, receiver units, and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
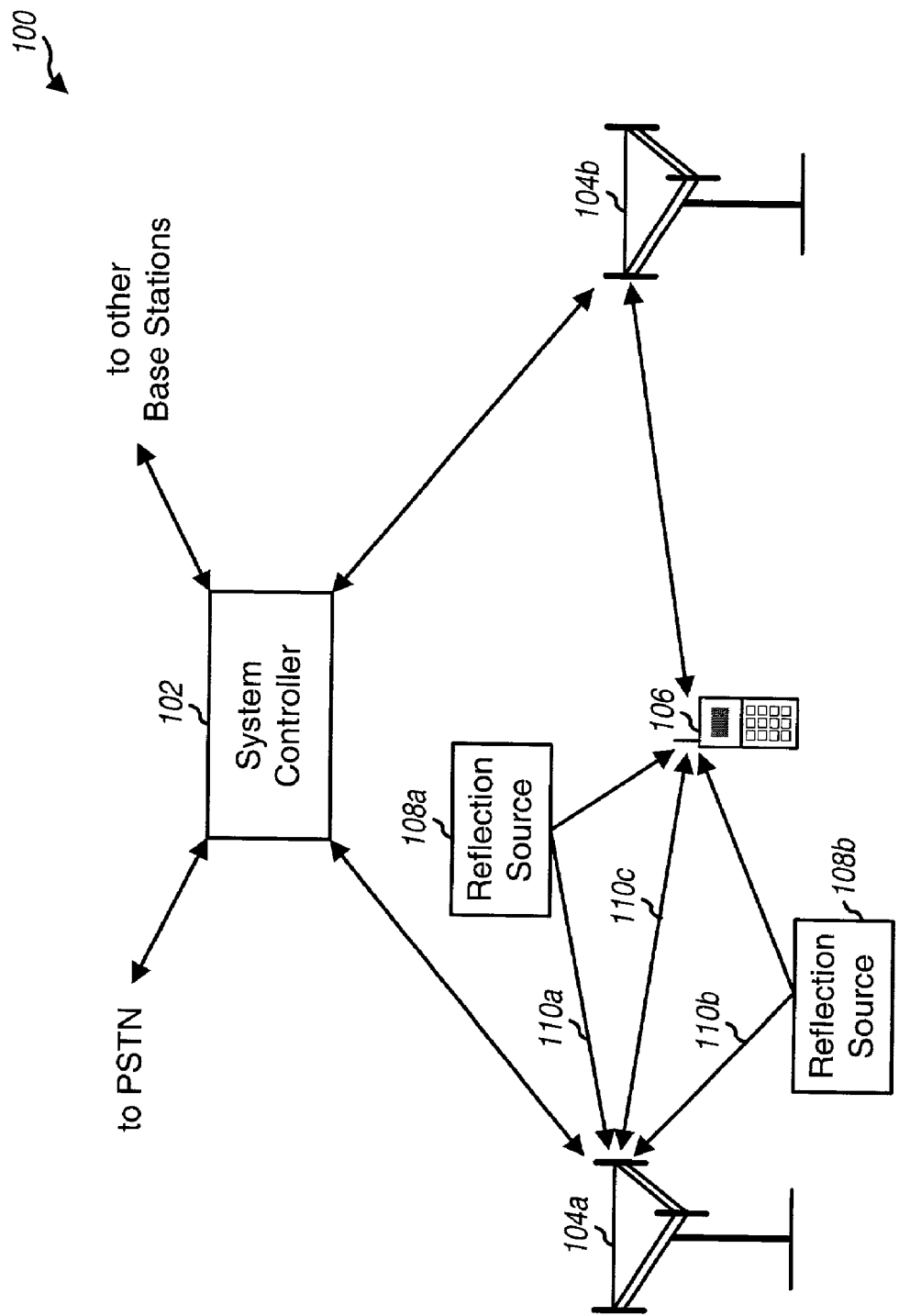
FIG. 1 is a diagram of a wireless communication system.

FIG. 1 is a diagram of a wireless communication system 100 wherein various aspects and embodiments of the invention may be implemented. System 100 provides communication for a number of cells, with each cell being serviced by a corresponding base station 104. Various terminals 106 are dispersed throughout the system (only one terminal is shown in FIG. 1 for simplicity). Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

As shown in FIG. 1, a signal transmitted from a base station may reach the terminal via one or multiple signal paths. These signal paths may include a straight path (e.g., signal path 110c) and/or reflected paths (e.g., signal paths 110a and 110b). A reflected path is created when the transmitted signal is reflected off a reflection source 108 and arrives at the terminal via a different path than the line-of-sight path. The reflection sources are typically artifacts in the environment in which the terminal is operating (e.g., buildings, trees, or some other structures). The received signal at the terminal may thus comprise a number of signal instances (or multipaths) from one or more base stations. The reverse link is also similarly affected by this multipath phenomenon.

In system 100, a system controller 102 (e.g., a base station controller (BSC)) couples to base stations 104 and may further couple to a packet data network via a packet data serving node (PDSN) and/or a public switched telephone network (PSTN) via a mobile switching center (MSC), all of which are not shown in FIG. 1. System controller 102 provides coordination and control for the base stations coupled to it, and further controls the routing of calls to terminals 106 via the coupled base stations.

System 100 may be designed to support one or more CDMA standards such as IS-95, cdma2000, IS-856, W-CDMA, TS-CDMA, and others. These CDMA standards are known in the art and incorporated herein by reference.

The pilot search techniques of the invention may be implemented on the forward link, and possibly the reverse link, in various CDMA systems. For clarity, these techniques are specifically described for the forward link in IS-95 and cdma2000 systems.

Figure 2:
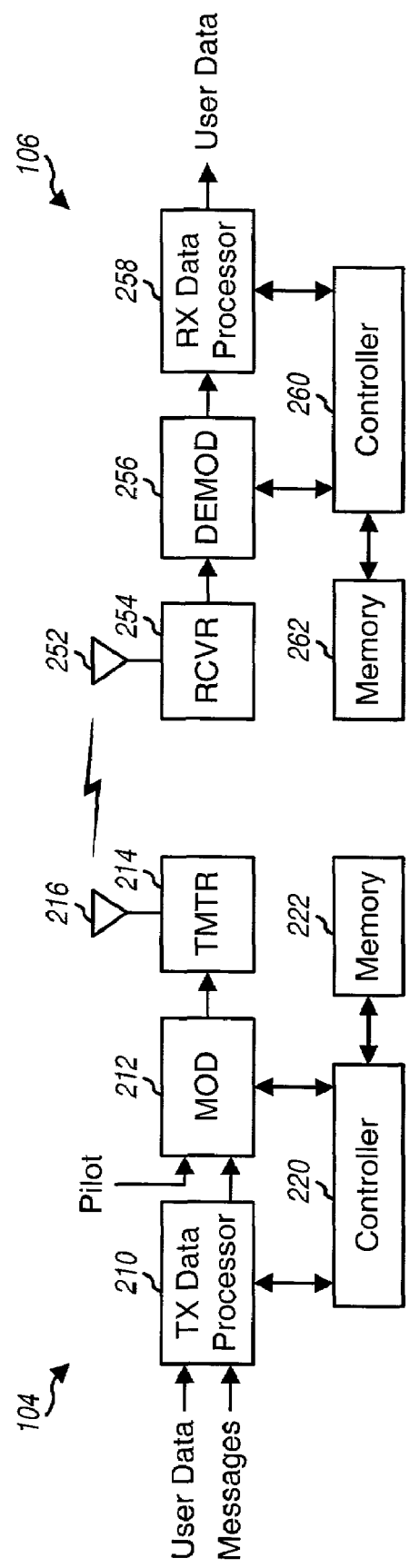
FIG. 2 is a simplified block diagram of an embodiment of a base station and a terminal.

FIG. 2 is a simplified block diagram of an embodiment of base station 104 and terminal 106. On the forward link, at base station 104, a transmit (TX) data processor 210 receives various types of "traffic" such as user-specific data, messages, and so on. TX data processor 210 then formats, (possibly) interleaves, and codes the different types of traffic based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 212 receives pilot data and the coded data from TX data processor 210, and further processes the received data to generate modulated data. For IS-95 and cdma2000, the processing by modulator 212 includes (1) channelizing (or covering) the data for each of a number of code channels (e.g., traffic, sync, paging, and pilot channels) with a respective Walsh code to channelize the user-specific data, messages, and pilot data onto their respective code channels, (2) summing the channelized data for all code channels, and (3) spreading the summed data with a complex pseudo-random noise (PN) sequence at a particular PN offset assigned to the base station. The pilot is typically channelized with a Walsh code of zero.

The modulated data is then provided to a transmitter unit (TMTR) 214 and conditioned (e.g., converted to one or more analog signals, amplified, filtered, and quadrature modulated) to generate one or more forward modulated signals, which are transmitted from one or more antennas 216 over a wireless link to the terminals.

At terminal 106, the forward modulated signals from one or more base stations are received by an antenna 252 and provided to a receiver (RCVR) 254. Receiver 254 conditions (e.g., filters, amplifies, and downconverts) the received signal and digitizes the conditioned signal to provide data samples. A demodulator (DEMOD) 256 then receives and processes the data samples to provide recovered symbols. For IS-95 and cdma2000, the processing by demodulator 256 includes (1) despreading the data samples with the (complex-conjugate) PN sequence used to spread the data at the base station, (2) channelizing (or decovering) the despread samples with the proper Walsh codes to channelize the received data and pilot onto their respective code channels, and (3) coherently demodulating the channelized data with pilot estimates recovered from the received signal. Demodulator 256 may implement a rake receiver that can process multiple signal instances (or multipaths) in the received signal, as described below.

A receive (RX) data processor 258 then receives and decodes the symbols from demodulator 256 to recover the user-specific data and messages transmitted on the forward link. The processing by demodulator 256 and RX data processor 258 is complementary to that performed by modulator 212 and TX data processor 210, respectively, at base station 104.

Controllers 220 and 260 may direct various operations at the base station and the terminal, respectively. Memory units 222 and 262 may be used to store data and codes for controllers 220 and 260, respectively.

Figure 3:
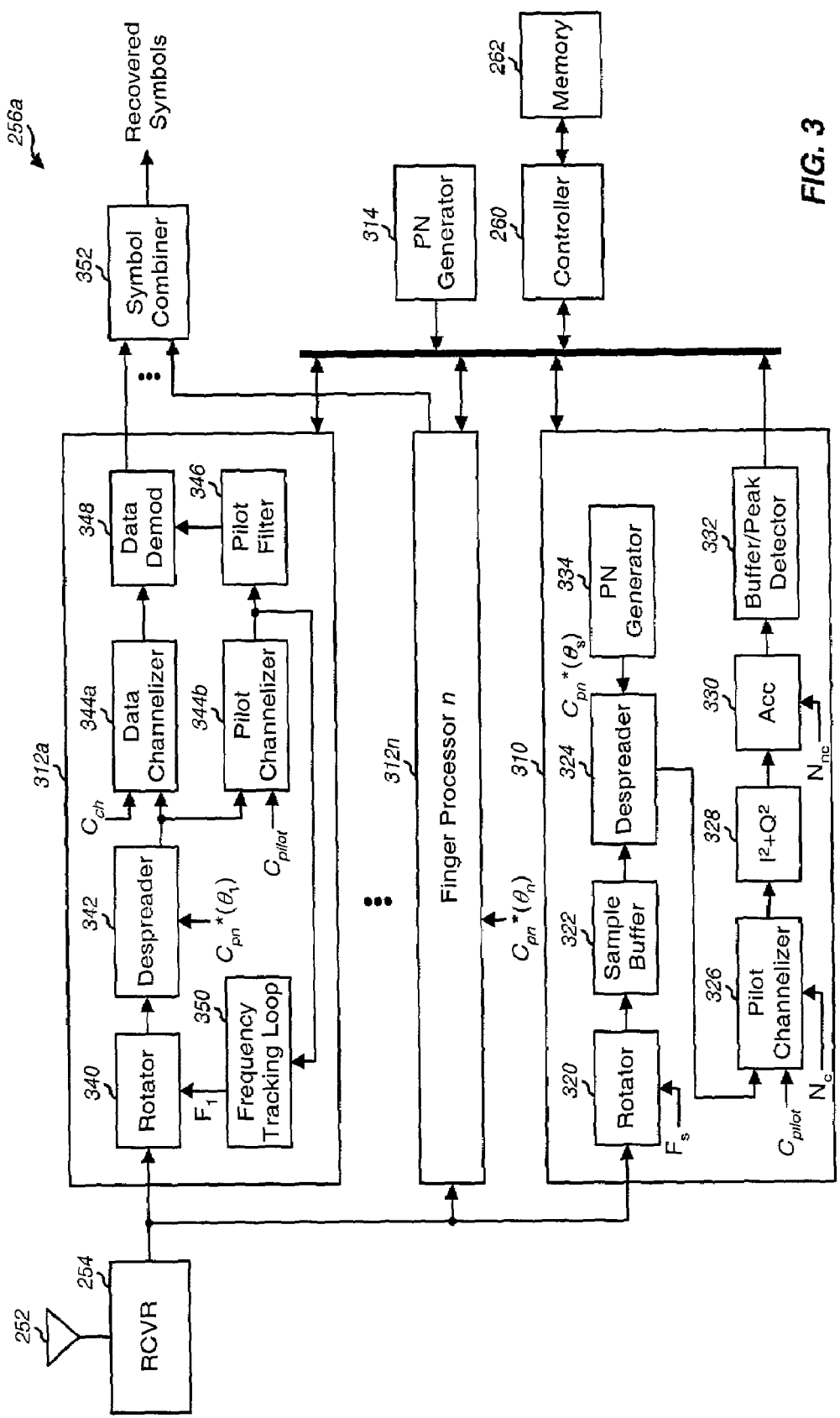
FIG. 3 is a block diagram of a rake receiver capable of implementing various aspects and embodiments of the invention.

FIG. 3 is a block diagram of a rake receiver 256a capable of implementing various aspects and embodiments of the invention. Rake receiver 256a may be used to implement demodulator 256 in FIG. 2. Rake receiver 256a includes a searcher 310, a number of finger processors 312, and a symbol combiner 352. In a specific design, rake receiver 256a includes eight finger processors (i.e., $M_f$=8), although other designs with more or fewer finger processors may also be used.

Receiver 254 conditions (e.g., filters and amplifies) the received signal, quadrature downconverts the conditioned signal, and digitizes the downconverted signal to provide complex data samples. The data samples from receiver 254 may be expressed as:

$$D_I(k) + jD_Q(k) = \sum_i \hat{S}(\hat{\theta}_i, k) \cdot e^{j\hat{\omega}_i k T_s}, \quad \text{Eq (1)}$$

where $D_I(k)$ and $D_Q(k)$ are the inphase and quadrature data samples, respectively, at sample time index k;

$\hat{S}(\hat{\theta}_i, k)$ is the i-th multipath in the received signal and is associated with a PN phase of $\hat{\theta}_i$, which includes the PN offset assigned to the transmitting base station as well as the propagation delay for this multipath;

$\hat{\omega}_i = 2\pi\Delta f_i$ is the speed of rotation for the i-th multipath, which includes Doppler frequency shift and downconversion frequency error; and $T_S$ is the sample period.

The data samples from receiver 254 are provided to searcher 310 and finger processors 312 of rake receiver 256a.

Searcher 310 is used to search for strong multipaths in the received signal and to provide an indication of the strength and timing of each found multipath that meets a set of criteria. Each finger processor 312 may then be assigned to process a respective multipath of interest (e.g., a multipath of sufficient strength, as determined by controller 260 based on the signal strength information provided by searcher 310).

The search for multipaths is typically performed based on the pilot included in each forward modulated signal. To search for strong multipaths, the data samples are correlated with a locally-generated PN sequence at various chip or sub-chip offsets (i.e., various PN phases). Due to the pseudo-random nature of the PN sequence, the correlation of the data samples with the PN sequence should be low, except when the phase of the locally-generated PN sequence is approximately aligned with that of a multipath, in which case the correlation results in a high value.

In the embodiment shown in FIG. 3, within searcher 310, the complex data samples are provided to a rotator 320, which performs a complex multiply of the data samples with a complex sinusoidal signal to generate phase-rotated data samples. The frequency of the sinusoidal signal is determined by a frequency control signal, $F_S$, and may be set to zero or some other value. Rotator 320 may be used to remove phase rotation in the data samples due to Doppler frequency shift and/or downconversion frequency error.

Since the same block of phase-rotated data samples may be evaluated at various PN phases, each of which corresponds to a hypothesis for a multipath, the samples are stored to a sample buffer 322. For each hypothesis to be evaluated by the searcher, the stored data samples from sample buffer 322 are provided to a despreader 324, which also receives from a PN generator 334 a complex-conjugate PN sequence, $C_{pn}^*(\theta_S)$, having a specific phase, $\theta_S$, corresponding to the hypothesis being evaluated. Despreader 324 despreads the phase-rotated data samples with the received PN sequence to provide despread samples.

PN generator 334 may generate the required PN sequence on the fly, or may generate and temporarily store for later use a number of (e.g., four) segments of the PN sequence at different phases. Typically, only a particular number of data samples are processed for each hypothesis, and only the same-size segment of the PN sequence needs to be generated or retrieved from storage for the hypothesis. In an embodiment, 512 PN chips of data samples are processed for each hypothesis, although a different number of data samples may also be processed.

To detect a pilot, a pilot channelizer 326 first multiplies the despread samples with the same channelization code, $C_{pilot}$, used to channelize the pilot at the base station (which is Walsh code zero for IS-95 and cdma2000). Pilot channelizer 326 then (coherently) accumulates the channelized pilot samples over $N_c$ PN chips to provide a complex pilot symbol, $P_I+jP_Q$. The coherent accumulation time interval is typically an integer multiple of the pilot channelization code length.

The pilot symbols are then squared by a squarer 328, and $N_{nc}$ squared pilot symbols are (non-coherently) accumulated by an accumulator 330 to provide a pilot energy estimate, $E_{pilot}$, for the hypothesis being evaluated. The pilot energy estimate may be expressed as:

$$E_{pilot} = \sum_{n=1}^{N_{nc}} P_I^2(n) + jP_Q^2(n). \quad \text{Eq (2)}$$

The parameters $N_c$ and $N_{nc}$ may be selected to provide high probability of pilot detection under various operating conditions. The pilot energy estimate, $E_{pilot}$, is then stored in a buffer/peak detector 332. After all hypotheses have been evaluated, buffer/peak detector 332 may be designed to provide a set of detected peaks for the hypotheses evaluated.

Finger processors 312 are used for data demodulation and may further be used for pilot acquisition. In the embodiment shown in FIG. 3, within each finger processor 312, the complex data samples are provided to a rotator 340, which performs a complex multiply of the data samples with a complex sinusoidal signal to generate phase-rotated data samples. Each multipath may be associated with a different Doppler frequency shift, and rotator 340 attempts to remove the phase rotation of the assigned multipath due to Doppler frequency shift and downconversion frequency error, as determined by a frequency tracking loop 350.

The phase-rotated data samples from rotator 340 are provided to a despreader 342, which also receives (e.g., from a PN generator 314) a complex-conjugate PN sequence, $C_{pn}^*(\theta_i)$, having a phase $\theta_i$ corresponding to the arrival time of the assigned multipath. This PN phase, $\theta_i$, is identified by searcher 310 in the detection process. Despreader 342 despreads the phase-rotated data samples with the received PN sequence to provide despread samples.

To recover the pilot, a pilot channelizer 344b first multiplies the despread samples with the same channelization code, $C_{pilot}$, used to channelize the pilot at the base station, and further accumulates the channelized pilot samples over a particular accumulation time interval (e.g., $N_c$ PN chips) to provide pilot symbols. The pilot symbols are then filtered by a pilot filter 346 to provide pilot estimates.

To recover the data on a particular code channel, a data channelizer 344a first multiplies the despread samples with the same channelization code, $C_{ch}$, used for the code channel being recovered, and further accumulates the channelized data samples over the length of the channelization code, $C_{ch}$, to provide data symbols. A data demodulator 348 then receives and demodulates the data symbols with the pilot estimates to generate demodulated symbols, which are provided to symbol combiner 352. Symbol combiner 352 receives and coherently combines the demodulated symbols from all finger processors 312 assigned to process the received signal, and provides recovered symbols to RX data processor 258 for further processing. The data demodulation and symbol combining may be achieved as described in U.S Pat. Nos. 5,764,687 and 5,490,165, which are incorporated herein by reference.

Aspects of the invention provide techniques to search for pilots over a designated code space. In one aspect, the pilot search is performed using a number of (e.g., two) substages, and the search windows for each substage may be selected such that the relevant code space is searched while at the same time reducing the search time. This may be achieved by (1) searching through (e.g., fixed-size) search windows during a first (detect) substage to detect for peaks in the received signal, and (2) searching through (e.g., variable-size) search windows during a second (dwell) substage to re-evaluate the detected peaks. Variable number of peaks may be returned by the dwell substage for the variable-size search windows. The formation of the search windows for each substage is described in further details below.

Figure 4A:
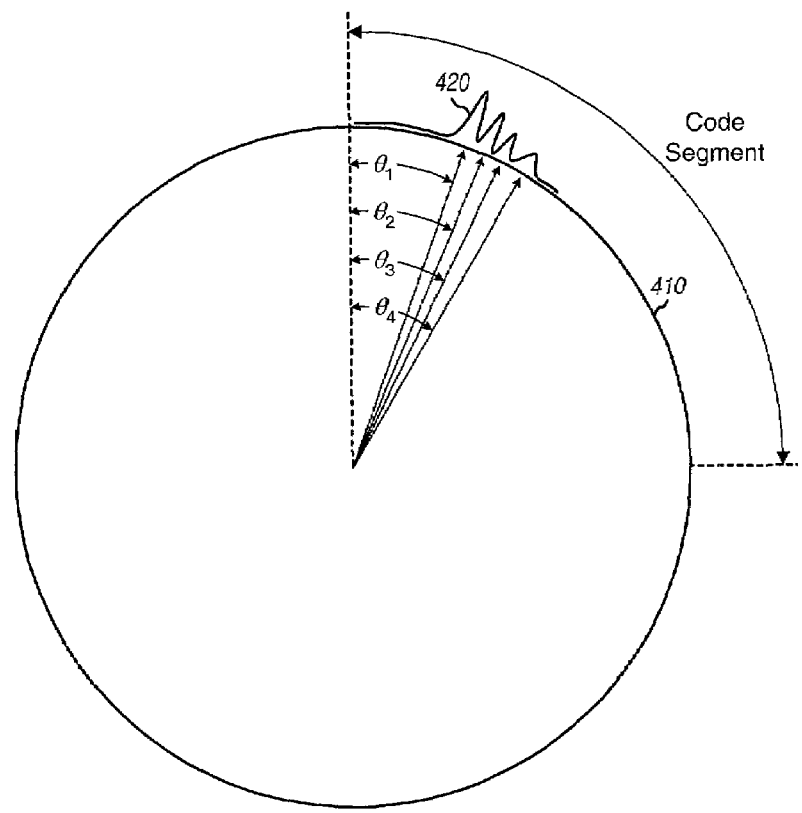
FIG. 4A is a diagram of a circle that represents the entire code space for a PN sequence.

FIG. 4A is a diagram of a circle that represents the entire code space for the PN sequence used to spread the data and pilot at the base station. For IS-95 and cdma2000, the PN sequence has a specific data pattern and a fixed length of 32,768 chips, with each chip of the PN sequence being assigned a respective PN chip index and corresponding to a specific phase of the PN sequence. The start of the PN sequence is assigned a PN chip index of 0 and the last chip of the PN sequence is assigned a PN chip index of 32,767. The PN sequence may be conceptually viewed as being placed on the circumference 410 of the circle, with the start of the PN sequence being aligned to the top of the circle (i.e., PN chip index of 0 is at the top of the PN circle). Although not shown in FIG. 4A, circumference 410 is partitioned into 32,768 evenly spaced points, and each point corresponds to a respective PN chip index (i.e., a respective PN phase). The length of the PN sequence is traversed by moving around the PN circle in a clockwise direction along circumference 410.

FIG. 4A also shows a received signal 420, at a terminal, having a number of peaks corresponding to a number of signal instances (or multipaths). As noted above, due to the multipath environment, a forward modulated signal transmitted from a base station may arrive at the terminal via a number of signal paths. Each base station may also transmit one or multiple forward modulated signals, depending on whether or not it is operating in a transmit diversity mode. Thus, the received signal at the terminal may comprise multiple instances of one or more forward modulated signals from each of one or more base stations. Each multipath in the received signal is typically associated with a respective magnitude, phase, and arrival time. In the example shown in FIG. 4A, the four multipaths are associated with PN phases of $\theta_1$, $\theta_2$, $\theta_3$, and $\theta_4$.

If the terminal is not aware of its location and/or system time (e.g., for an initial acquisition at power-on), then a full search for the pilots may need to be performed over the entire PN code space. And if some information is known of the terminal's location and/or system time (e.g., after a wakeup from a sleep), then a limited search for the pilots over a portion of the entire PN code space may be sufficient.

Various schemes may be used to search for and acquire pilots. In one scheme, the entire code space to be searched is swept during a detection step, and acquisition is then attempted on a set of largest peaks found during the detection step. In another scheme, the entire code space to be searched is swept during a detection step, a set of peaks found during the detection step is re-evaluated during a dwell step to remove noise peaks and find the largest peaks, and acquisition is then attempted on these largest peaks. A number of pilot search and acquisition schemes may thus be used. For clarity, various aspects and embodiments of the invention are described for the second scheme whereby the entire code space is initially swept and detected peaks are then re-evaluated to provide candidate peaks on which acquisition is attempted.

Figure 5:
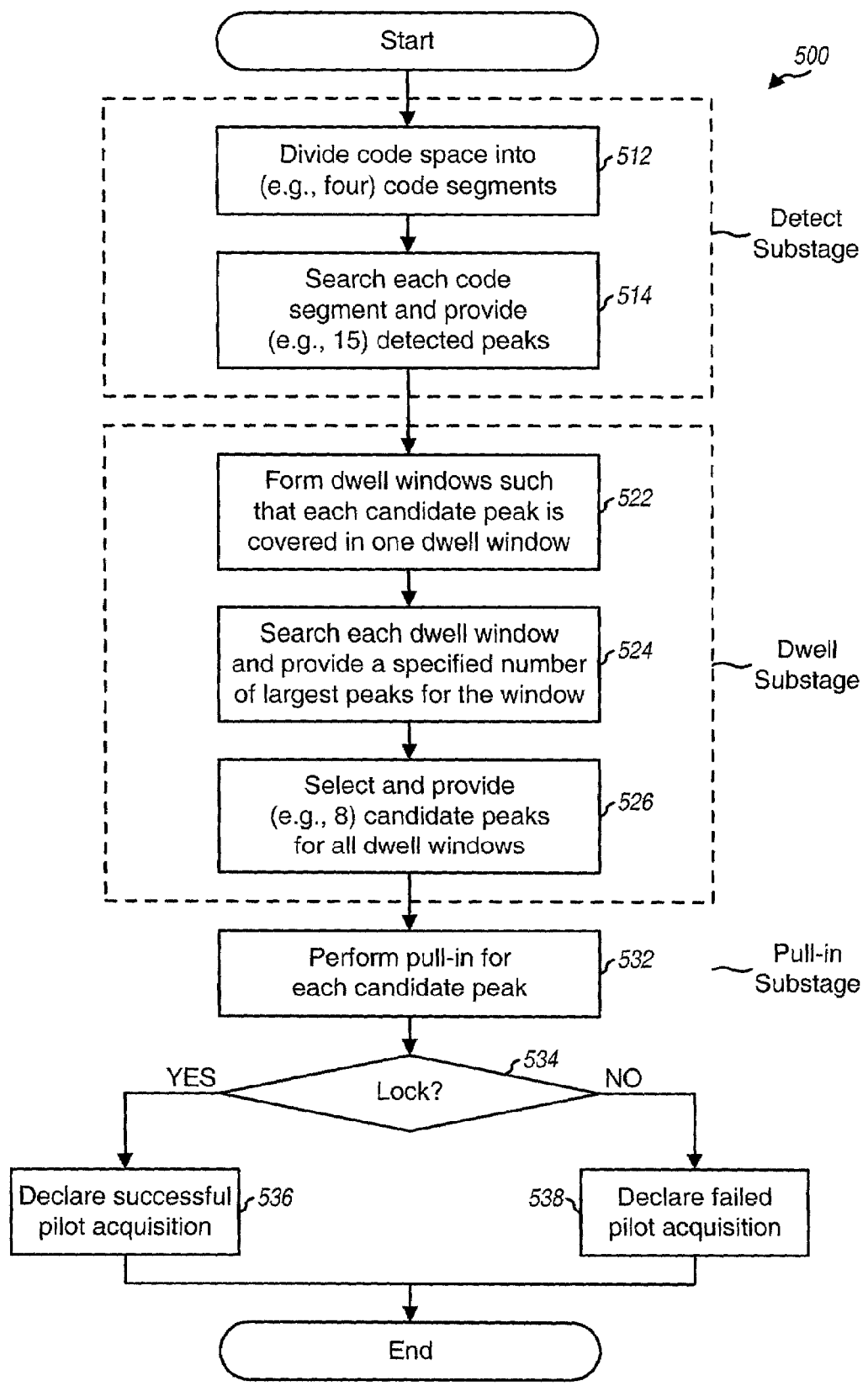
FIG. 5 is a flow diagram of an embodiment of a stage that may be used to search for and acquire pilots in a designated code space.

FIG. 5 is a flow diagram of an embodiment of a stage 500 that may be used to search for and acquire pilots in a designated code space. Stage 500 includes three substages—detect, dwell, and pull-in substages. The detect and dwell substages search for peaks over the designated code space, and the pull-in substage performs acquisition of the candidate peaks provided by the dwell substage.

For the detect substage, the entire code space to be searched is initially divided into a number of (e.g., non-overlapping) code segments, at step 512. The number of code segments and the size of each code segment may be selected based on the specific design of the searcher. As an example for a full search in IS-95 and cdma2000, the entire PN code space of 32,768 PN chips may be divided into four code segments, with each code segment including 8192 PN chips (i.e., four search windows, each with a size of $W_S=8192$). In an embodiment, the four code segments may be searched in parallel by four search units within the searcher (each search unit may be implemented as shown in FIG. 3 for searcher 310). Each code segment is then searched, and a particular number of detected peaks are provided, at step 514. The detected peaks are typically the largest peaks found in the code segment. In a specific implementation, 15 detected peaks are provided for each code segment, and a set of $M_{det}=60$ detected peaks is provided by the detect substage for the four code segments.

For the dwell substage, a number of dwell windows are initially formed such that each detected peak is (preferably) covered in only one dwell window, at step 522. The dwell windows are also formed such that a small PN code space is searched for each detected peak. This small PN code space may be between 4 to 8 PN chips (e.g., 5 PN chips, or ±2 PN chips on each side of the peak). The formation of the dwell windows is described in further detail below. A search is then performed over each dwell window, and a specific number of peaks are provided as the search results for each dwell window, at step 524. After all dwell windows have been searched, a particular number of the peaks from all dwell windows are selected and provided as the candidate peaks, at step 526. The number of candidate peaks provided by the dwell substage may be equal to the number of finger processors available for use for acquisition (i.e., $M_{dw}=M_f$), although more or fewer peaks may also be provided by the dwell substage. In a specific implementation, a set of $M_{dw}=8$ candidate peaks is provided by the dwell substage for the designated code space.

For the pull-in substage, a finger processor is initially assigned to each candidate peak, and each finger processor attempts to acquire and lock to the frequency and timing of the assigned peak, at step 532. The frequency pull-in may be achieved by the frequency tracking loop included in the finger processor, and acquisition of the multipath timing may be achieved by a time tracking loop that may also be included in the finger processor but is not shown in FIG. 3 for simplicity. If a lock to at least one candidate peak is achieved, as determined in step 534, then a successful pilot acquisition is declared, at step 536. Otherwise, an acquisition failure is declared at step 538 and other actions may be performed. In either case, the stage terminates.

The basic stage shown in FIG. 5 may be used to form numerous pilot search and acquisition schemes, some of which are described in U.S. patent application Ser. No. 09/971,903, entitled "METHOD AND APPARATUS FOR ACQUIRING PILOTS OVER CODE SPACE AND FREQUENCY ERRORS IN A CDMA COMMUNICATION SYSTEM," filed Oct. 4, 2001, assigned to the assignee of the present application and incorporated herein by reference.

The detect and dwell substages are used to provide improved probability of pilot detection over the designated code space. The detect substage may provide a number of noise peaks, some of which may be comparable in magnitude or may even be larger than the pilot peaks. The dwell substage then re-evaluates each detected peak to verify whether the peak is due to signal or noise. If the noise is random and independent (i.e., uncorrelated), then there is small likelihood of two large noise peaks occurring at the same PN phase at different times. Thus, in an embodiment, the detect and dwell substages are performed over different sets of data samples obtained at different times. The correlation of another set of data samples with the PN sequence by the dwell substage reduces the number of noise peaks and thus the probability of false pilot detection.

Figure 4B:
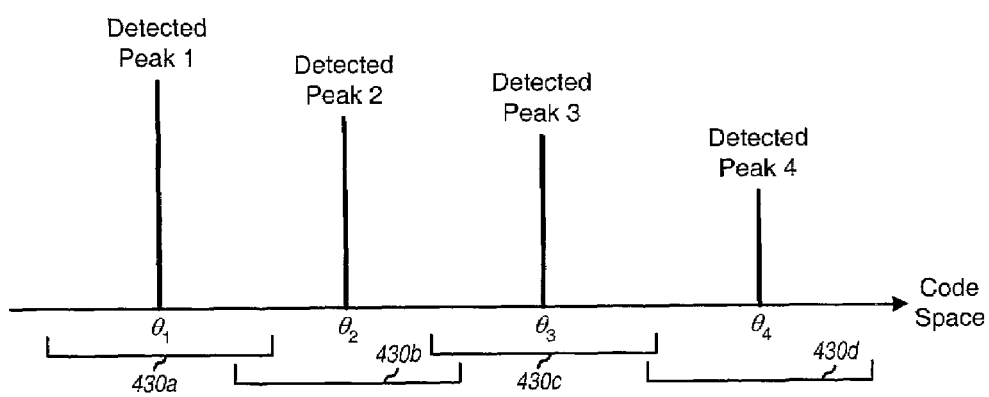
FIG. 4B illustrates a dwell for four peaks in the received signal shown in FIG. 4A.

FIG. 4B illustrates the dwell substage for the four peaks in the received signal shown in FIG. 4A. The dwell substage for each detected peak is typically performed over a small individual search window of a few PN chips centered at the detected peak. The size of the individual search window is selected to be as small as possible (to reduce search time) but large enough to account for various factors such as, for example, the drift in a local oscillator (e.g., a VCTCXO) that provides the clocks used for sampling the received signal, Doppler frequency shift due to movement of the terminal, changes in the arrival time of the multipath, and so on. Typically, a small window of, e.g., 5 PN chips (or ±2 PN chips from the peak) is sufficient to cover the expected worse case drift for a detected peak. As shown in FIG. 4B, individual search windows 430a through 430d are used for the four detected peaks in the received signal.

In many instances, the detected peaks may be closely spaced in time (and thus in PN code space). If two or more detected peaks are within $W_{dw}$ chips of each other, then their individual search windows for the dwell substage can overlap. In this case, the dwell substage may provide the same search result for multiple windows.

Figure 6A:
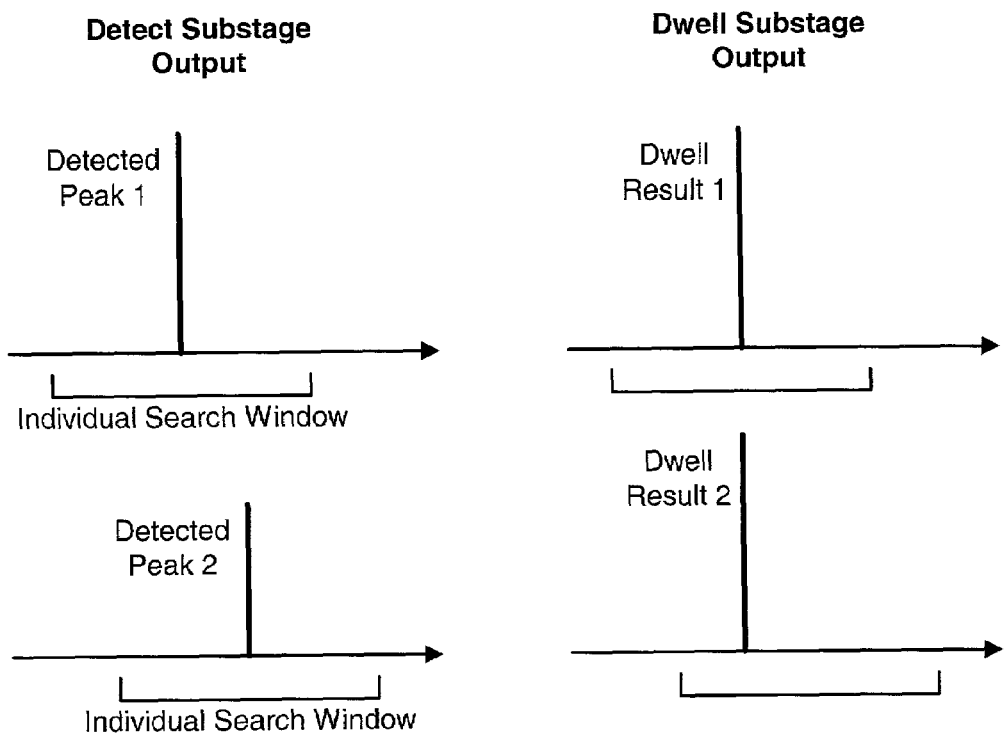
FIG. 6A illustrates the generation of duplicate search results by the dwell substage for overlapping individual search windows.

FIG. 6A illustrates the generation of duplicate search results by the dwell substage for overlapping individual search windows. In this example, detected peaks 1 and 2 are separated by $L_{12}$ chips, and peak 1 is larger than peak 2. For the dwell substage, an individual search window of size $W_{dw}$ is placed on each detected peak, with the window being centered at the peak. Because the separation between the two peaks is less than the size of the window (i.e., $L_{12}<W_{dw}$), the windows for these two peaks overlap, as shown in FIG. 6A. When the dwell is performed over these two windows, the same dwell result (peak 1) is provided for both windows because peak 1 is in both windows and is also larger than peak 2. This situation may also occur with more than two peaks, if there is some overlap between their windows.

As noted above, duplicate dwell results are undesirable for several reasons. First, an omitted peak (e.g., peak 2 in the example above) may be among the $M_f$ largest peaks that should be provided to the pull-in substage, even though it may be smaller than the duplicate peak (e.g., peak 1). Second, the duplicate dwell results may each be assigned a finger processor for the pull-in substage, assuming that the energy of the peak is sufficiently high to merit such assignment. Multiple finger processors may then be used to acquire and track the same pilot instance, which would then tie up valuable resources that may otherwise be used to process other valid multipaths. Omission of a strong peak may result in degraded performance.

It may be common for the detected peaks to be close in time, especially if they are multipath components for the same transmitted signal. Moreover, duplicate dwell results may occur multiple times for a given designated code space. Thus, techniques that can ameliorate the generation of duplicate results by the dwell substage are highly desirable.

Figure 6B:
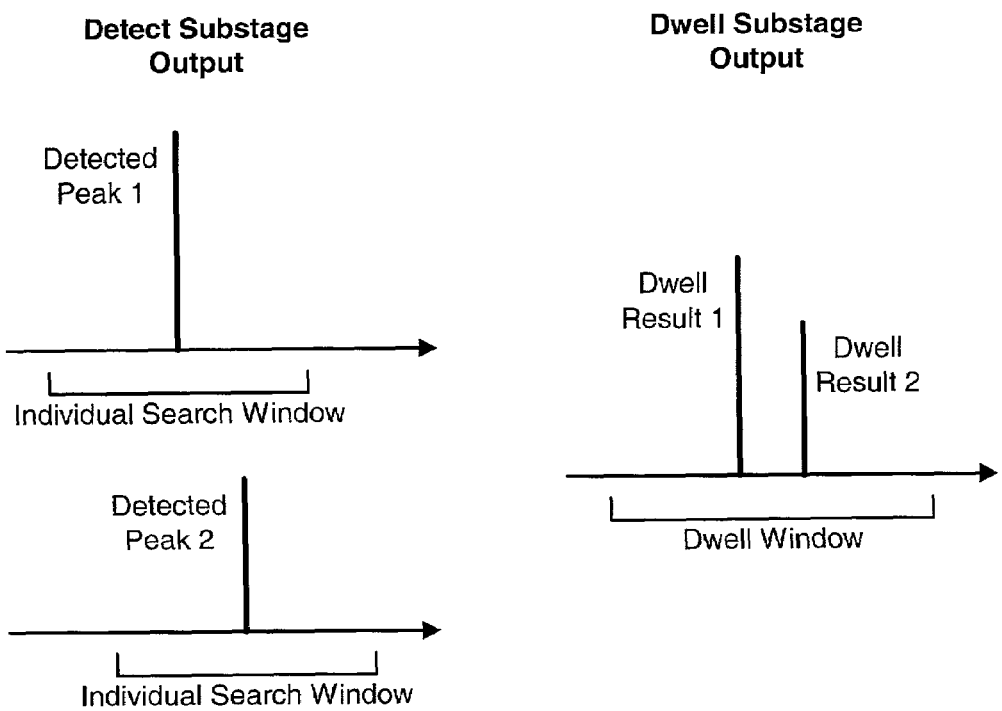
FIG. 6B illustrates the formation of a dwell window in accordance with an embodiment of the invention.

FIG. 6B illustrates the formation of a dwell window in accordance with an embodiment of the invention. In this example, detected peaks 1 and 2 are separated by $L_{12}$ chips, which is less than the size of the individual search window (i.e., $L_{12}<W_{dw}$). However, since the individual search windows overlap for these two detected peaks and a possibility exists for providing the same dwell result for these two overlapping windows, a single dwell window is formed for these two peaks and two dwell results are returned for the dwell window. This technique eliminates the possibility of providing duplicate search results for overlapping individual search windows. As an additional benefit, the time required to search a dwell window will likely be less than the time required to search the individual search windows that make up the dwell window because less search setup overhead is required (e.g., for one dwell window instead of two individual search windows) and a smaller code space may be searched (i.e., the overlapping code space is not searched twice).

Figure 7:
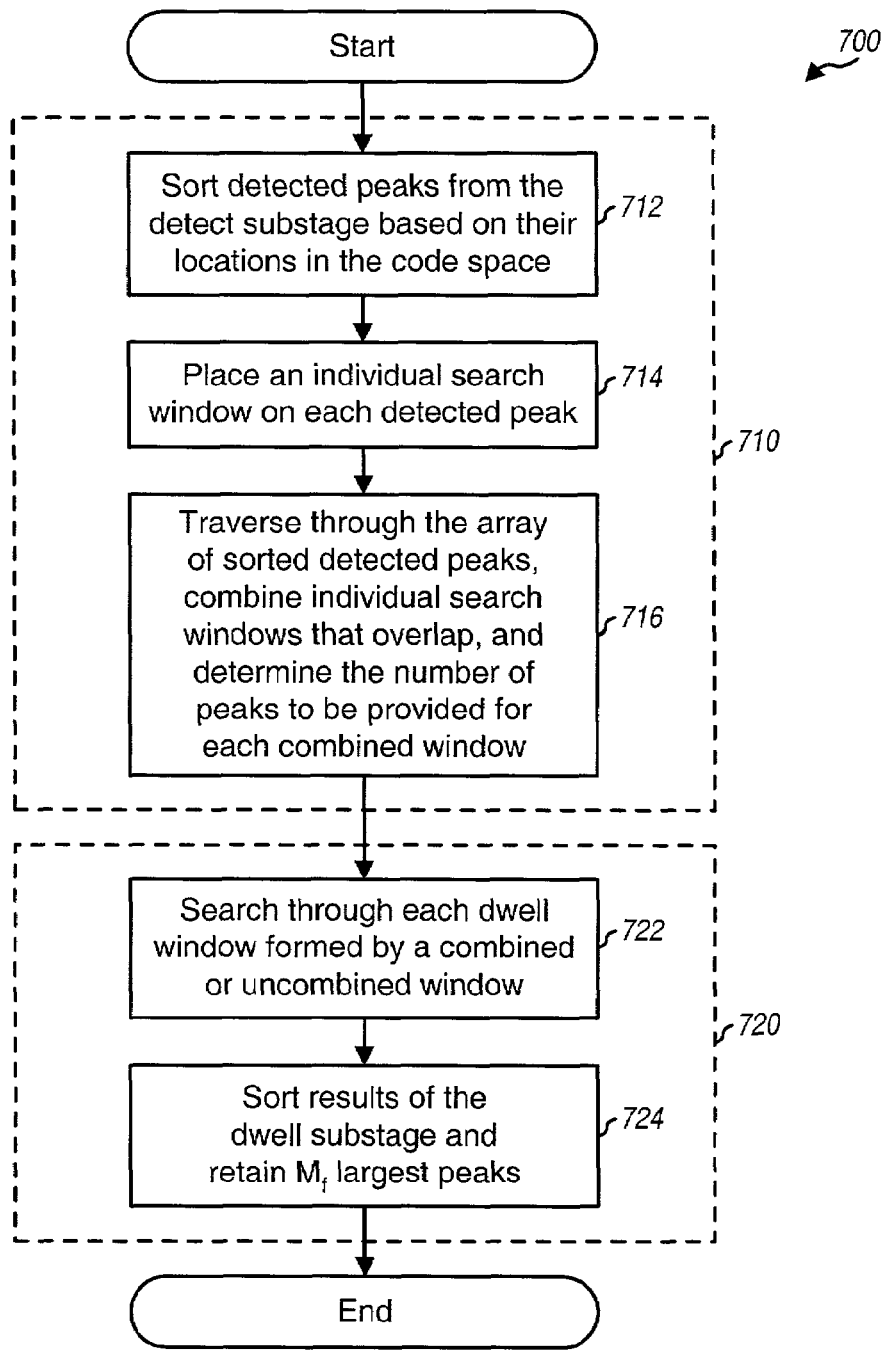
FIG. 7 is a flow diagram of an embodiment of a process to form dwell windows for the dwell substage and to perform the dwell.

FIG. 7 is a flow diagram of an embodiment of a process 700 to form dwell windows for the dwell substage and to perform the dwell. Block 710 includes steps used to form the dwell windows, and block 720 includes steps for the dwell substage.

Within block 710, the detected peaks from the detect substage are initially sorted based on their locations (e.g., by increasing position) in the code space, at step 712. For the implementation described above wherein four search units are operated to search four non-overlapping code segments that make up the entire PN code space, the detected peaks from each search unit may be sorted (by their positions or locations in the PN code space) and the sorted peak locations for the four segments may be combined (i.e., concatenated) into an array of $M_{det}$ locations for the $M_{det}$ detected peaks provided by the detect substage.

An individual search window is then placed on each detected peak, at step 714. In an embodiment, the individual search windows are of fixed size (e.g., 5 PN chips) and centered at the detected peaks. The array of peak locations is then traversed, and any overlapping individual search windows are combined with an adjacent window to form a larger window, at step 716. Once the array has been traversed, the combined and uncombined windows comprise the dwell windows. In an embodiment, the number of peaks to be returned by the dwell substage for each dwell window is equal to the number of individual search windows combined to form the dwell window. For example, if three overlapping individual search windows are combined to form a dwell window, then three peaks are to be returned for the dwell window.

In block 720, the dwell substage is performed and each dwell window is searched, at step 722. After all dwell windows have been searched, the peaks from the dwell substage are sorted and the $M_f$ largest peaks are retained and provided to the pull-in substage, at step 724. Various details for process 700 are described below.

The formation of the dwell windows may take into account various factors including the limitations of the hardware. For example, the search unit may be designed with the capability to provide a particular maximum number of search results (e.g., $M_{max}=15$ peaks) for any given code space to be searched. In this case, the maximum number of individual search windows that may be combined into one dwell window may be limited by this number $M_{max}$. Moreover, since the number of finger processors available for pull-in may be limited (e.g., $M_f=8$), only the $M_f$ largest candidate peaks may be assigned for pull-in concurrently. In this case, a practical limit on the maximum number of peaks to be returned for any given dwell window may be $M_f$, and potentially larger dwell window may be split at this size.

A specific implementation of process 700 using pseudo-code is described below.

```
10    sort_results(position[i]);
20    peaks[i] =1         //number of peaks to return for each window
30    window[i]=W         //size of each window, initialized to W
40    start[i] =position[i]-W/2      //start of each window
50    for (i=1, j=0; i < M; ++i) {
60        if ((i-j) >= Mf)
70            j = i;
80        diff = start[i] - (start[j]+window[j]);
90        if (diff < 0) {
100           window[j]    = start[i]+window[i]-start[j];
110           peaks[j]     = peak[j]+1;
120           peaks[i]     = 0; }
130       else { j = i; }
140   }
150   if ((j != 0) and ((peaks[0]+peaks[j])<= Mf)) {
160       diff = (start[0]+32768)-(start[j]+window[j]);
170       if (diff < 0) {
180           window[0]    = start[0]+window[0]+32768-start[j];
190           start[0]     = start[j];
200           peaks[0]     = peaks[j]+1;
210           peaks[j]     = 0; }
220   }
230   for (i=0; i < M; ++i) {
240       if (peaks[i]==0) continue;
250       else program_searcher(start[i],window[i], peak[i]);
260   }
```

In the above pseudo-code, shortened notations are used, with $M=M_{det}$ and $W=W_{dw}$. Mf is selected as the minimum of (1) the number of finger processors available for the pull-in substage and (2) the maximum number of peaks to be returned by the searcher for a single dwell window. The M detected peaks provided by the detect substage are initially sorted by increasing position on the PN circle and stored to the position[i] array (line 10). As noted above, if the search units of the searcher are programmed to search over non-overlapping code segments, then the results from each search unit may be sorted and the sorted results from all search units may then be combined (or concatenated) and stored to the position[i] array.

The other arrays used to form the dwell windows are also initialized (lines 20–40). The window[i] array stores the sizes of the dwell windows, which are all initialized to the size of the individual search window, W (line 30). The peaks[i] array stores the number of peaks to be returned by the dwell substage for the corresponding dwell windows in the window[i] array, and is initialized with one (line 20). The start[i] array stores the start positions of the windows in the window[i] array, and is initialized based on the positions of the detected peaks in the position[i] array and the size of the individual search window, W (line 40).

A "for loop" (lines 50 through 150) then traverses through the window[i] array, combines any overlapping windows into a single larger dwell window, and updates the number of peaks to be returned for each dwell window. In the "for loop", i is the index for the next individual search window in the window[i] array that may be combined, and j is the index for the current dwell window.

In an embodiment, no more than $M_f$ individual search windows are combined into a single dwell window. If adding the next individual search window (window[i]) to the current dwell window (window[j]) results in more than $M_f$ peaks being included in the dwell window (line 60), then a new dwell window is formed (lines 60 and 70).

A determination is then made whether or not the next individual search window overlaps with the current combined window. This is achieved by computing the difference between the start of the next individual search window (start[i]) and the end of the current dwell window (start[j]+window[j]) (line 80). If the windows overlap (line 90), then the size of the current dwell window is extended to the end of the next individual search window (start[i]+window[i]) (line 100), the number of peaks to be returned by the dwell substage is incremented by one (line 110), and the individual search window that has been combined is removed by setting the number of peak to be returned for that window to zero (line 120). Otherwise, if the windows do not overlap, then the current dwell window is set as the next individual search window (line 130).

Steps 150 through 220 combine the last dwell window (window[j]) with the first individual search window (window[0]), if allowed. Combination of these windows may be allowed, for example, if the first individual search window is not already combined with the last dwell window (j !=0) and combining these windows would not result in more than $M_f$ peaks being included in the new window (line 150). If combination is allowed, then a determination is first made whether or not these windows overlap (lines 160 and 170). If the windows overlap (line 170), then the first individual search window is combined with (and at the end of) the last dwell window (lines 180 through 210).

At the end of line 220, the combined and uncombined windows in the window [i] array for which at least one peak is to be returned by the dwell substage represent the dwell windows. The search units are then programmed to search each dwell window. To program the search units for the dwell substage, the window[i] array is traversed (line 230). If a particular individual search window is already combined with another window (by checking whether peaks[i]=0), then that window is skipped (line 240). Otherwise, as a search unit becomes available, it is programmed to search the next dwell window (window[i]) and to provide the (peak[i]) best search results for the window (line 250).

As each search over a given dwell window (window[i]) is finished, the peak[i] best search results are returned for this window and sorted. If only the $M_f$ best results are to be provided by the dwell substage, then the $M_f$ best results may be retained and the other results may be discarded. After all dwell windows have been searched, the $M_f$ best peaks comprise the candidate peaks that are provided to the pull-in substage.

If the dwell window is not limited to a particular number of peaks (e.g., not limited to $M_f$ peaks for $M_f$ finger processors available for the pull-in substage), then any number of individual search windows may be combined into a single dwell window, as long as these individual search windows overlap. In this case, the dwell windows would not overlap, and no duplicate search result would be provided by the dwell windows.

However, if each dwell window is limited to a maximum size of $M_f$ peaks, then some dwell windows may overlap and duplicate search results may be provided by overlapping dwell windows. For example, if there are 20 overlapping individual search windows and $M_f=8$, then these individual search windows may be combined into three dwell windows containing 8, 8, and 4 peaks. At the boundary of each pair of overlapping dwell windows, there may be as many as ($W_{dw}-1$) duplicate peaks. Even though the likelihood of such events is small, the dwell windows may be formed in a manner to reduce the likelihood of duplicate search results and/or to reduce the impact of such duplicate search results, as described below.

In one scheme, the dwell windows are formed to minimize the amount of overlap between dwell windows while observing other constraints (e.g., the dwell window size being limited to $M_f$ peaks). The amount of overlap between the individual search windows is unlikely to be uniform, and it is also not necessary to combine the next $M_f$ peaks to form each dwell window. The $M_{det}$ individual search windows may be traversed initially to determine clusters of overlapping individual search windows and good places to break up each cluster. For the above example with 20 overlapping individual search windows, the overlap may be reduced, for example, by forming three dwell windows containing 5, 8, and 7 peaks.

In another scheme, the dwell windows are formed with no overlap by truncating the overlapping ends. This is similar to the partitioning of the entire code space into non-overlapping code segments for the detect substage. Equal amount may be truncated from the ends that overlap.

In yet another scheme, the dwell windows are formed such that (1) clusters of overlapping individual search windows are broken up at the positions of smaller detect peaks and (2) large detected peaks are biased toward the center of the dwell windows. This scheme may provide improved performance if more than $M_f$ peaks are clustered near each other. For this scheme, it is presumed that the dwell energies for the smaller detected peaks would also be smaller. An algorithm for forming dwell windows for this scheme is provided below.

1. Sort the detected peaks by their positions, as described above.
2. Select the largest detected peak (i.e., with the largest energy). Its neighbors are the two detected peaks (one on each side) closest in position.
3. Identify the neighbor with the highest energy. If this neighbor's window overlaps the window for the selected peak, then combine their windows as described above. If combining the windows would make the total number of peaks greater than $M_f$, then do not combine with this neighbor. Evaluate the other neighbor in similar manner.
4. Select the detected peak with the next highest energy and its (possibly combined) window. This detected peak's neighbors are the two detected peaks closest in position and which have not already been combined with the selected peak. The neighbors' windows are the (possibly combined) windows that contain the neighbors.
5. Repeat steps 3 and 4 until all detected peaks have been considered Several schemes for forming dwell windows are described above for illustration. Numerous other schemes may also be used, and this is within the scope of the invention.

The pilot search techniques described above may be extended to cover any number of substages used for pilot detection. The earlier substage(s) may be used to initially sweep through the entire code space to be searched, and subsequent substage(s) may be used to re-evaluate the detected peaks. The search windows for each subsequent substage may be formed such that a code space as small as possible is searched (to shorten search time). This may entail generating variable-size search windows and returning variable number of search results for each such search window. The search windows may also be formed to take into account various factors such as, for example, the limitations of the hardware.

For clarity, the inventive techniques have been described for the search for pilots. In general, these techniques may be used to search for any type of signal. To achieve this, the processing by the searcher would be complementary to that performed at the transmission source for the signals to be searched. The inventive techniques may also be used for pilots that are gated, in which case the searcher is appropriately timed such that the processing is performed on the pilot portions.

Also for clarity, various aspects and embodiments of the invention have been described for the forward link in IS-95 and cdma2000. The techniques described herein may also be adapted for use on the reverse link. In IS-95 and cdma2000, each terminal is assigned a scrambling code used to distinguish that terminal. The scrambling code is combined (or multiplied) with the PN sequence to generate a spreading sequence that is used to spread the data prior to transmission to the base station. A search for the signals from each transmitting terminal may be performed over a respective code space to detect peaks, which may then be re-evaluated, as described above.

The techniques described herein may also be adapted for use in other CDMA systems, such as W-CDMA systems. Some of the processing in W-CDMA is different from that for IS-95 and cdma2000. For example, "covering" with a Walsh code in IS-95 and cdma2000 is equivalent to "spreading" with an orthogonal variable spreading factor (OVSF) code in W-CDMA, and "spreading" with the PN sequence in IS-95 and cdma2000 is equivalent to "scrambling" with a scrambling sequence in W-CDMA. The techniques described herein may be adapted to account for the difference in signal processing. For example, the code space to be searched may be determined based on the scrambling sequence used in W-CDMA (instead of the PN sequence).

The pilot search techniques described herein may be implemented by various means. For example, these techniques may be implemented in hardware, software, or a combination thereof. For a hardware implementation, the elements used for pilot search (e.g., the searcher and support circuitry) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used for pilot search may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as it known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for searching for pilots in a wireless communication system, comprising:
searching in a first stage over a designated code space for peaks in a received signal and providing a set of detected peaks;
forming in a second stage a plurality of dwell windows for the detected peaks, wherein the dwell windows have variable sizes and cover variable numbers of detected peaks, the variable sizes and the variable numbers of detected peaks being determined based on locations of the detected peaks in the designated code space; and
searching over the dwell windows for peaks in the received signal and providing a set of one or more candidate peaks.

2. The method of claim 1, wherein the designated code space comprises all or a portion of a pseudo-random noise (PN) sequence used to generate the pilots.

3. The method of claim 1, wherein the forming the plurality of dwell windows for the detected peaks includes
placing an individual search window on each detected peak, and
combining overlapping individual search windows.

4. The method of claim 3, wherein the number of peaks to be returned for each dwell window is determined based on the number of individual search windows combined to form the dwell window.

5. The method of claim 3, further comprising:
sorting the detected peaks based on their locations in the designated code space.

6. The method of claim 3, wherein the forming the plurality of dwell windows for the detected peaks further includes
limiting the number of overlapping individual search windows to be combined for each dwell window.

7. The method of claim 3, wherein the forming the plurality of dwell windows for the detected peaks includes
limiting the number of overlapping individual search windows to be combined for each dwell window based on the number of peaks provided by the search over the dwell window.

8. The method of claim 3, wherein the overlapping individual search windows are combined such that overlap between the dwell windows is minimized.

9. The method of claim 3, wherein the overlapping individual search windows are combined such that larger detected peaks are biased toward the center of the dwell windows.

10. The method of claim 1, wherein the dwell windows are non-overlapping.

11. The method of claim 3, wherein each individual search window has a predetermined size.

12. The method of claim 11, wherein the predetermined size of each individual search window is 5 PN chips or less.

13. The method of claim 3, wherein the individual search window is centered at each detected peak.

14. The method of claim 1, wherein the dwell windows are formed such that each detected peak is included in only one dwell window.

15. The method of claim 1, wherein the communication system is a CDMA system.

16. The method of claim 15, wherein the CDMA system conforms to IS-95 or cdma2000 standard.

17. A method for searching for pilots in a wireless communication system, comprising:
searching over a designated code space for peaks in a received signal and providing a set of detected peaks;
forming a plurality of dwell windows for the detected peaks by placing an individual search window of a particular size on each detected peak and combining overlapping individual search windows, wherein the number of peaks to be returned for each dwell window is equal to the number of individual search windows combined to form the dwell window; and
searching over the dwell windows for peaks in the received signal and providing a set of one or more candidate peaks selected from among the peaks returned for the dwell windows.

18. A demodulator in a wireless communication system, comprising:
a searcher operative to search over a designated code space for peaks in a received signal for a first stage and to provide a set of detected peaks; and
a controller operative to form a plurality of dwell windows for the detected peaks for a second stage, wherein the dwell windows have variable sizes and cover variable numbers of detected peaks, the variable sizes and the variable numbers of detected peaks being determined based on locations of the detected peaks in the designated code space, and wherein the searcher is further operative to search over the dwell windows for peaks in the received signal for the second stage and to provide a set of one or more candidate peaks.

19. The demodulator of claim 18, further comprising:
one or more finger processors operative to process and acquire the set of one or more candidate peaks.

20. The demodulator of claim 18, wherein the controller is operative to
place an individual search window on each detected peak, and
combine overlapping individual search windows to form the dwell windows.

21. The demodulator of claim 18, wherein the designated code space includes all or a portion of a pseudo-random noise (PN) sequence used to generate pilots.

22. A CDMA terminal device, comprising:
a searcher operative to search over a designated code space for peaks in a received signal for a first stage and to provide a set of detected peaks; and
a controller operative to form a plurality of dwell windows for the detected peaks for a second stage, wherein the dwell windows have variable sizes and cover variable numbers of detected peaks, the variable sizes and the variable numbers of detected peaks being determined based on locations of the detected peaks in the designated code space, and wherein the searcher is further operative to search over the dwell windows for peaks in the received signal for the second stage and to provide a set of one or more candidate peaks.

23. The CDMA terminal device of claim 22, further comprising: one or more finger processors operative to process and acquire the set of one or more candidate peaks.

24. The CDMA terminal device of claim 22, wherein the controller is operative to
place an individual search window on each detected peak, and
combine overlapping individual search windows to form the dwell windows.

25. The CDMA terminal device of claim 22, wherein the designated code space includes all or a portion of a pseudo-random noise (PN) sequence used to generate pilots.

26. The method of claim 1, further comprising:
determining the number of peaks to return for each dwell window based on the number of the number of detected peaks covered by the dwell window.

27. The method of claim 17, wherein the forming the plurality of dwell windows for the detected peaks comprises
limiting the number of overlapping individual search windows to be combined for each dwell window to a predetennined number.

28. The method of claim 17, wherein the dwell windows are non-overlapping.

29. The method of claim 17, wherein the individual search windows are combined such that overlap between the dwell windows is minimized or avoided.

* * * * *